Figure 1:

Forsyth & Haley,

Elastic Roll.

No. 102,104. Patented Apr. 19, 1870.

Inventor:
Jas. B. Forsyth
John J. Haley
by their attys.
Crosby, Halsted & Gould

Witnesses
J. B. Kidder.
M. W. Frothingham.

United States Patent Office.

JAMES B. FORSYTH AND JOHN J. HALEY, OF BOSTON, MASSACHUSETTS.

Letters Patent No. 102,104, dated April 19, 1870.

IMPROVEMENT IN ELASTIC ROLLS.

The Schedule referred to in these Letters Patent and making part of the same.

*To all whom it may concern:*

Be it known that we, JAMES B. FORSYTH and JOHN J. HALEY, both of Boston, in the county of Suffolk and State of Massachusetts, have jointly invented an Improvement in the Manufacture of Elastic Rolls; and we do hereby declare that the following, taken in connection with the drawings which accompany and form part of this specification, is a description of our invention sufficient to enable those skilled in the art to practice it.

In elastic rolls used in wringing-machines, and for similar purposes, where such rolls have been formed with arbors covered by rubber or rubber compounds, great difficulty has been experienced in keeping the covering from turning upon the arbor, or the arbor from turning in the covering, and many devices have been employed to effectually unite the arbor and covering.

Our invention relates to a manner of constructing rolls having rigid mandrels or arbors covered with elastic rubber or rubber compounds, so that the said parts shall be so effectually united that relative turning motion between said parts is rendered impossible without absolutely tearing asunder the yielding part of the roll.

We practice our invention as follows:

The arbor being prepared, we take strong cloth, like duck, and cover and saturate it with a viscid, unvulcanized, vulcanizable rubber compound, and wind this tightly around the arbor until it is covered with a sufficient thickness. Then, through the rubber and cloth, and through the arbor in holes previously made, we drive fastenings of metal of any convenient form, and secure the ends of said fastenings by turning, clinching, or riveting them upon the wolding on the arbor.

These fastenings being applied in sufficient numbers, more cloth, prepared with a similar compound, is tightly wound over the wolds secured by the metal fastenings, or unvulcanized, vulcanizable rubber or rubber compound, without cloth, and in sheets, is wolded over the rubber cloth and fastenings, or a tube of vulcanizable unvulcanized rubber or rubber compound is stretched over the material already fastened to the arbor, and then the arbor and the material upon it are submitted, in the usual way and by the usual means, to heat, and all the rubber and rubber compounds on the arbor are vulcanized and united together, so that the fastenings which pass through the arbor, and have their ends in the rubber or rubber compound, hold the arbor and the elastic covering thereof firmly together.

The drawings show our improved manufacture in various slight modifications, the figures being elevations of our improved rolls, in which the elastic material at one end of each roll is represented as removed to exhibit the construction.

In Figure 1, *a* is the arbor between flanges *b*, on which the first rubber-coated wolds of cloth are wound, and are marked *c*.

Through the said wolds metal staples *d* are passed, going through suitable holes drilled in the arbor, and when the uniting-bar of the two prongs of each staple is brought down upon and imbedded in the wolded material, then the ends of the staple-prongs are bent closely down upon and into the wolded material on the other side.

Outside of the fastenings more rubber-covered cloth, *e*, is tightly wound, and upon that is wound a strip of sheet-rubber or rubber compound, or a tube of rubber or rubber compound is stretched over the material *e*, and then the roll is submitted to heat, and is vulcanized in the well-known way.

Figure 2:
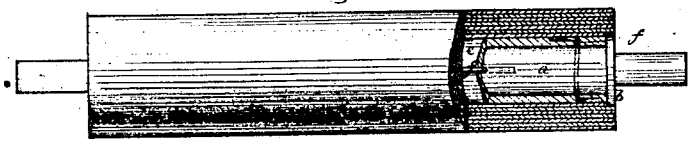

In Figure 2 there is no second wolding of rubber-cloth outside of the fastenings *f*, which are mere pieces of wire with the ends bent in opposite directions down upon and imbedded into the wolding.

Figure 3:

Figure 3 is like fig. 2 in all respects except that the ends of the wire fastenings *g* are bent in the same direction.

Figure 4:
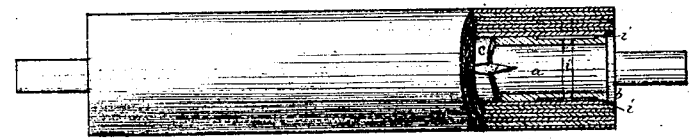

The only difference between Figure 4 and figs. 3 and 2 is in the metal fastenings *i*, in which the wire passing through the arbor has one broad long head, and is riveted on the other side into a similar head, or both ends of the wire *i* may be riveted into heads.

All of the rubber or rubber compound described is unvulcanized when placed upon the roll, but is so mixed and prepared as to be vulcanizable when treated at a sufficiently high temperature, and, when applied to the arbor, is preferably in a viscid or pasty condition.

Instead of passing the fastenings entirely through the arbor and through both opposite sides of the wolding *c*, the entering ends of the fastenings may terminate in the arbor instead of passing through it and through the woldings on both sides of the arbor, but we prefer to have the fastenings pass entirely through both sides of the wolding *c*, and through the arbor.

We claim—

An elastic roll, in which the metal mandrel or arbor, being first coated with duck or other strong cloth saturated with rubber, and extending around but not through the arbor, such coat is fastened to the arbor by staples, pins, or rivets, the rubber sheet or sheets being then vulcanized upon the roll and to the coating, as described.

JAMES B. FORSYTH.
JOHN J. HALEY.

Witnesses:
FRANCIS GOULD,
J. B. CROSBY.